United States Patent [19]

Matsuoka et al.

[11] 4,296,944
[45] Oct. 27, 1981

[54] COVERING CONSTRUCTION OF A GUIDE RAIL

[75] Inventors: Hideoki Matsuoka, Yokohama; Yoshinobu Kondo, Kosai, both of Japan

[73] Assignees: Nissan Motor Company, Limited, Yokohama; Fuji Kiko Co., Ltd.,, Tokyo, both of Japan

[21] Appl. No.: 118,432

[22] Filed: Feb. 4, 1980

[30] Foreign Application Priority Data

Feb. 5, 1979 [JP] Japan .............................. 54-13974[U]

[51] Int. Cl.³ ............................................. B60R 21/10
[52] U.S. Cl. .................................................. 280/804
[58] Field of Search ...................... 280/804; 160/19, 38

[56] References Cited

U.S. PATENT DOCUMENTS

| 4,223,915 | 9/1980 | Tanaka | 280/804 |
| 4,232,885 | 11/1980 | Suzuki | 280/804 |
| 4,236,730 | 12/1980 | Suzuki | 280/804 |

*Primary Examiner*—Robert R. Song
*Attorney, Agent, or Firm*—Schwartz, Jeffery, Schwaab, Mack, Blumenthal & Koch

[57] ABSTRACT

A covering construction of a guide rail for housing the sliding member of a passive type safety seat belt of an automotive vehicle comprises a plastic cover sheet applied on the opening of the guide rail and having a slit normally closed by the sheet member which allows the sliding member to move freely therein.

3 Claims, 3 Drawing Figures

U.S. Patent     Oct. 27, 1981     4,296,944
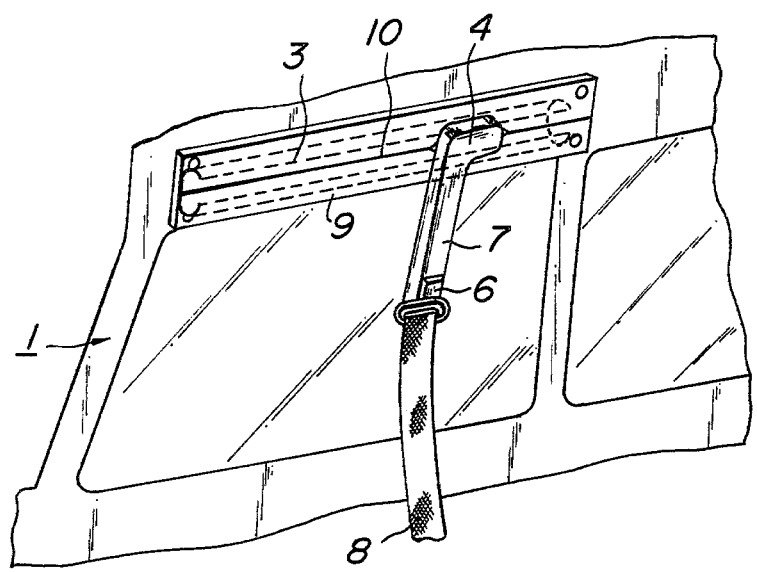
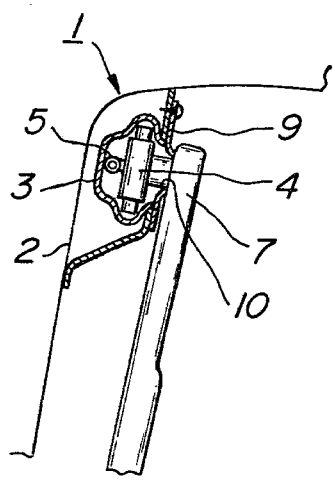
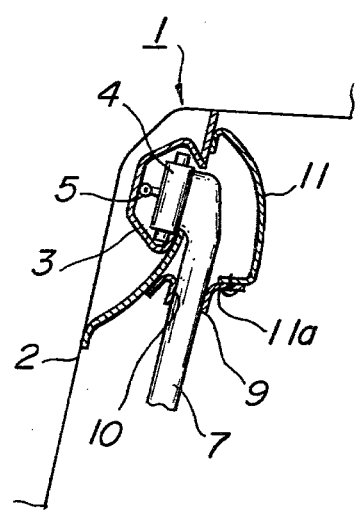

4,296,944

COVERING CONSTRUCTION OF A GUIDE RAIL

BACKGROUND OF THE INVENTION

The present invention relates to a seat belt device used in a vehicle such as an automotive vehicle. More especially, the present invention relates to covering construction for a guide rail of a passive type safety seat belt.

In a conventional passive type seat belt, a driving source of the seat belt, for instance, a push-pull wire, moves a sliding member mounted in a guide rail arranged inside the vehicle body, to a frontward position when a person going to take a seat opens the door of the vehicle. The above explained pulling motion is correlated with the opening of the door so that the safety seat belt is moved away from the sitting position of the person when the door is opened. After the person is sitting in the seat, the abovementioned sliding member is moved back to a rearward position along the guide rail by closing the door so that the belt is properly fastened against the person in the seat.

In the aforementioned safety seat belt device, the opening of the guide rail and a portion of the sliding member coupling thereto are exposed inside the cabin and as a result, there exists the danger that children may hurt the hand or finger by inadvertently putting the finger in the guide rail. Besides the above, a disadvantage exists in that dust may occlude the guide rail. Furthermore the opening of the guide rail might spoil the ornamental feeling for the inner decorative arrangement of the cabin.

SUMMARY OF THE INVENTION

The present invention is to mitigate the above-mentioned difficulty of the conventional seat belt device of the type comprising a guide rail mounted inside the body of a vehicle and a sliding member coupled in the guide rail to slide freely and connected to a belt. The improvement, according to the present invention comprises an elastic cover sheet of plastic material, rubber, cloth, knitting or the like, applied on the surface of opening of the guide rail, and having a slit at the middle of the elastic cover sheet and extending along the guide rail. The cover sheet is arranged to close the slit while allowing passage of the sliding member in the slit. The cover sheet closes the opening of the guide rail normally so that occlusion by dust or small particles may be prevented and at the same time an inadvertent locking of fingers or hand can be avoided.

BRIEF DESCRIPTION OF THE DRAWINGS

FIG. 1 is a perspective view of a portion of a safety seat belt device according to the present invention;

FIG. 2 is a cross-sectional view showing diagrammatically the essential portion including the guide rail of the device shown in FIG. 1; and FIG. 3 is an alternative embodiment of a view corresponding to FIG. 2.

DESCRIPTION OF THE PREFERRED EMBODIMENT

The invention will now be described for embodiments applied to an automotive vehicle.

In FIGS. 1 and 2, reference numeral 1 designates a body of a vehicle. Inside the body and at inner portion of roof side 2 of the body, a guide rail 3 having a substantially trough shaped cross-section is arranged to extend nearly horizontally. A sliding member 4 is coupled and housed in the guide rail 3 to freely slide along the guide rail 3. A push-pull wire 5 is provided in the rail to act on the sliding member 4 as its driving cable. This push-pull wire 5 is so arranged as to cause a sliding movement of the sliding member 4 forwardly or rearwardly along the guide rail 3 correlated with the opening and closing operation of the door. A slide anchor 7, having a tongue 6 at the bottom side as shown in FIG. 1, is provided on the sliding member 4 integrally therewith. At the lower end of the slide anchor 7, a shoulder belt 8 is coupled.

Inside the roof side 2 and at a position defining the surface of the guide rail 3, a unitary flexible cover sheet 9 is provided to cover the opening of the guide rail 3 for its substantial portion and is attached by means of screws or the like. At middle of the cover sheet 9, a slit 10 is provided along the guide rail 3. The flexible cover sheet 9, with the slit 10 is located to nip the sliding member 4 from top and bottom directions.

According to the construction of the present invention, when the push-pull wire 5 pulls the sliding member 4 to move forwardly in the guide rail 3 at the time of opening of the door, the sliding member 4 moves forwardly by forcedly opening the slit 10 of the cover sheet 9, while the cover sheet 9, at the slit 10, restores the position to close the opening of the guide rail 3 by its flexibility after passing of the sliding member 4.

Likewisely, at the rearward movement or reciprocal movement of the sliding member 4 along the guide rail 3, the flexible cover sheet 9 always closes the slit 10 by its flexibility. Accordingly, the cover sheet 9 always keeps the slit 10 closed except at except the position where the sliding member 4 locates; to prevent occlusion by dust in the guide rail 3 and to hinder inadvertent pushing-in of fingers of children or so. By covering the opening of the guide rail 3, a better ornamental looking of inside the cabin is achieved.

FIG. 3 shows another embodiment of the present invention. In this embodiment, a cover member 11 having substantially L shaped cross-section is mounted inside the roof side 2, where the guide rail 3 locates, in a manner to overlap or encircle the guide rail 3. A bottom opening 11a is provided in the cover member 11. Through this bottom opening 11a, a slide anchor 7 formed integrally with the sliding member 4 extends downwardly and a flexible cover sheet 9 with slit just like the foregoing embodiment is provided to close the bottom opening. Also in this embodiment, the sliding member 4 with the slide anchor 7 moves freely in the slit along the guide rail 3. The cover sheet 9 prevents occlusion by dust and a same advantage can be obtained as has been explained with respect to the embodiment shown in FIG. 2.

The present invention is not limited to the embodiment wherein the guide rail is locating at the roof side, it may equally be applied for a guide rail provided at a suitable portion of the body or the door. The invention can also be applied for a passive safety seat belt device in which a through ring is fixed on a sliding member and the belt is moved. Accordingly the invention is not limited to a case where the belt is fixed on a sliding member.

As explained in substantial detail in the foregoing, the invention applied for comprises a protective cover member 9 for a guide rail 3, mounted on an inner wall of the body 1, having a sliding member 4 mounted to freely slide in the guide rail 3, which is coupled with the belt 8. The cover sheet 9, forming a protecting cover member, is arranged on the surface of the opening of the guide rail 3, and a slit 10 is provided at middle of the cover sheet 9 to pinch the sliding member 4 from top and bottom sides thereof. The inventive structure can prevent occlusion by dust and other small particles to keep the lubrication oil very clean. Further it affords an advantage of reducing the danger of injury to a hand or finger inadvertently caught by the guide rail or the sliding member and moreover an improved ornamental appearance to the cabin.

What is claimed is:

1. A covering construction of a guide rail of a safety seat belt device of a vehicle having a guide rail with an opening and mounted on an inner wall of the vehicle and a sliding member arranged to slide freely in the guide rail and extending beyond the opening and connected to a seat belt, the improvement lies in that a flexible cover sheet, having a slit extending in the middle thereof and along the opening of the guide rail, is arranged to normally close said opening of the guide rail and allowing passage of the sliding member in the slit.

2. A covering construction of a guide rail as claimed in claim 1 wherein the flexible cover sheet is made of plastic material, rubber, cloth, knitting and the like.

3. A covering construction of a guide rail as claimed in claim 1, wherein the guide rail is provided with an overlapping cover member having a substantially L-shaped cross-section and an open bottom side, and said flexible cover sheet with a slit is provided to close said open bottom side of said cover member.

* * * * *